R. KIND.

Billiard-Cushions.

No. 155,587.

Patented Oct. 6, 1874.

Attest:
Geo E Gardner
Louis A Inham

Inventor:
Richard Kind

UNITED STATES PATENT OFFICE.

RICHARD KIND, OF SAN FRANCISCO, CALIFORNIA.

IMPROVEMENT IN BILLIARD-CUSHIONS.

Specification forming part of Letters Patent No. 155,587, dated October 6, 1874; application filed February 27, 1874.

*To all whom it may concern:*

Be it known that I, RICHARD KIND, of the city and county of San Francisco, State of California, have invented certain Improvements in Billiard-Cushions, of which the following is a specification:

The first part of my invention relates to separating the rubber part of the cushion into four or more parts, and cementing these parts together, forming one whole compact body.

The second part of my invention relates to the combination of the rubber, together with the introduction of a steel rib or plate placed in the rubber at a distance of a quarter of an inch, more or less, from the outer edge of the rubber, the steel rib or plate being placed with its edge even with the top part of the rubber, the steel rib or plate to be cemented in a piece of cloth extending along and cemented to the face of the rubber; then covering this outer cloth, together with steel plate or rib, with a layer of rubber, which is also to be cemented; then covering these entire rubber parts, steel rib or plate, and cloth, as mentioned above, with a layer of rubber of the thickness of a sixteenth of an inch, more or less.

Figure 1:
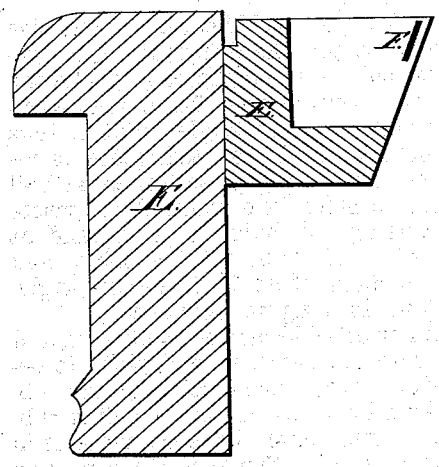
Figure 2:
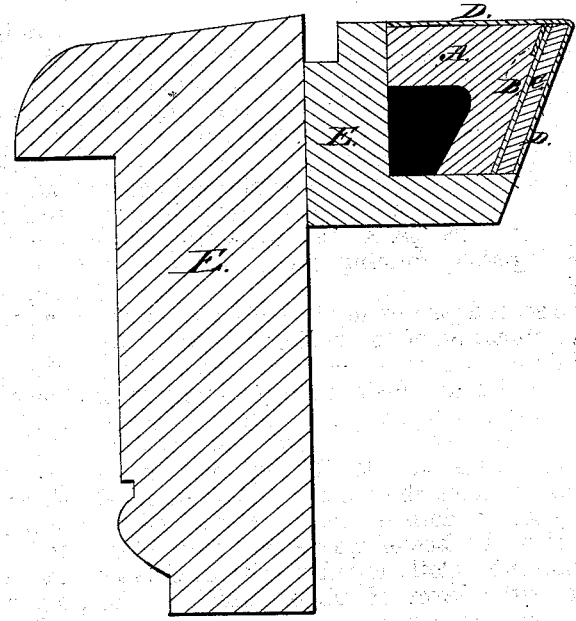
Figure 3:
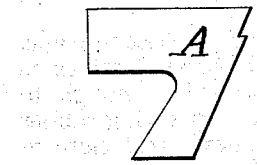
Figure 4:
Figure 5:
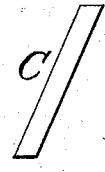
Figure 6:
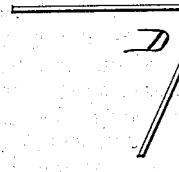

Figure 1 is a vertical section of a cushion as heretofore made, and Fig. 2 represents a like section of a cushion on my improved plan. Fig. 3 is the supporting-rubber molded in shape. Fig. 4 is the steel rib or plate, around which is cemented a piece of cloth. Fig. 5 is a piece of rubber to be cemented against the steel plate or rib with cloth. Fig. 6 is the outward layer of rubber used to cover the whole combination.

India-rubber cushions have heretofore been made with an opening near the upper part of the india-rubber, and a short distance within the face of the rubber, and a steel plate pushed into this opening, as represented at F, Fig. 1 of the accompanying drawing.

The object of using a steel plate or hard substance so embedded in the india-rubber, is to prevent the balls, when striking the cushion, from becoming too much embedded in the cushion, the rubber being too soft to form the required resistance, and hence, to increase the elastic force and the accuracy of the rebound, particularly when the balls strike the cushion with considerable force, and at an angle less than a right angle. But in thus pushing or introducing a steel plate it remains loose in the opening, and when the ball strikes the cushion the steel plate twists around, causing the balls to jump, and at times throwing the balls off the table, and sending the balls off at an incorrect angle, the steel plate forming no resistance.

The manner of molding the rubber around the steel plate, causes the steel plate to become uneven through the tension of the rubber, and experience shows that molding rubber around a steel plate, the steel plate is in places higher, and in other places lower; furthermore, that the rubber will never flow evenly at all places around the steel plate, which makes the cushion incorrect, as the ball strikes the steel plate in some places higher and in other places lower.

The object of my invention is to avoid the bad effects above pointed out, and to this end my said invention consists in combining with a vulcanized india-rubber cushion for billiard-tables, a steel rib or plate, but to improve on the manner of its introduction, and also the making of the cushion on my improved plan, described as follows:

A is the supporting-rubber, molded in shape. B is the steel plate or rib, around which is cemented a piece of cloth wide enough to reach to the bottom of the supporting-rubber A, Fig. 3, both steel plate or rib and cloth to be cemented against the face of the supporting-rubber A, Fig. 3, the cloth forming a support to the steel plate or rib, and serving to hold the steel plate or rib immovably in its proper place. C is a piece of rubber to be cemented against the steel plate or rib and cloth B. D is the outward layer of rubber covering this entire combination, so as to form a solid body. E is the wood-work. Taking the supporting-rubber A, the steel rib or plate B, together with cloth, is cemented against the face of the supporting-rubber A, then the outside piece of rubber C is cemented against the steel rib or plate with cloth B, and then this entire combination is covered over and cemented with the outward layer D.

I make no claim to the steel plate or rib, for I am aware that this is not new; but

I claim as my invention—

The billiard-cushion herein described, consisting of the rubber cushion A, the cloth-wrapped strip B, the rubber plate C, and the outer elastic layer D, when all said parts are constructed and arranged substantially as specified.

RICHARD KIND.

In presence of—
D. K. SWIM,
L. A. IMHAUS.